US008348744B2

(12) United States Patent
Duhamel et al.

(10) Patent No.: US 8,348,744 B2

(45) Date of Patent: Jan. 8, 2013

(54) PARTICIPATION-GAME SYSTEM INCLUDING AN END-OF-GAME EVALUATION MEANS

(75) Inventors: Gérald Duhamel, Drummondville (CA); Marie-Claude Gagnon, Drummondville (CA); Martin Roy, Drummondville (CA)

(73) Assignee: Labtronix Concept inc., Drummondville ( * ) Notice: Subject to any disclaimer, the term of this patent is extended or adjusted under 35 U.S.C. 154(b) by 1009 days.

(21) Appl. No.: 10/722,132

(22) Filed: Nov. 26, 2003

(65) Prior Publication Data

US 2004/0171414 A1 Sep. 2, 2004

Related U.S. Application Data

(63) Continuation-in-part of application No. 10/364,673, filed on Feb. 12, 2003, now Pat. No. 7,270,603.

(51) Int. Cl.
*G06F 17/00* (2006.01)

(52) U.S. Cl. .......... 463/18; 463/22

(58) Field of Classification Search .......... 463/17–19, 463/22

See application file for complete search history.

(56) References Cited

U.S. PATENT DOCUMENTS 4,087,092 A * 5/1978 Krause et al. .......... 463/17
4,157,829 A * 6/1979 Goldman et al. .......... 463/17
5,072,381 A * 12/1991 Richardson et al. .......... 463/19
5,157,602 A * 10/1992 Fields et al. .......... 463/22
5,265,880 A 11/1993 Maksymec
5,494,293 A * 2/1996 Goldfarb .......... 273/269
5,927,716 A 7/1999 Goodson et al.
6,398,644 B1 * 6/2002 Perrie et al. .......... 463/18
6,398,646 B1 * 6/2002 Wei et al. .......... 463/19
6,733,385 B1 5/2004 Enzminger et al.
2001/0034262 A1 * 10/2001 Banyai .......... 463/17
2002/0094860 A1 * 7/2002 Itkis et al. .......... 463/19

OTHER PUBLICATIONS

Kentucky Gaming Regulations http://www.lrc.state.ky.us/KRS/154A00/110.PDF.*
Kentucky Gaming Regulations <http://www.lrc.state.ky.us/KRS/154A00/110.PDF>.*
John Scarne, Scarne's New Complete Guide to Gambling, copyright 1961, Simon & Schuster, pp. 158-160.*
Kentucky Gaming Regulations, http:/www.lrc.state.ky.us/KRS/154A00/110.PDF (effective Jul. 16, 2006, see p. 5).*

* cited by examiner

*Primary Examiner* — Michael Cuff
(74) *Attorney, Agent, or Firm* — Benoît & Côté

(57) ABSTRACT

The invention consists in a method of playing a participation game involving comparison of players' objects (a.k.a. game cards) with a common object (a.k.a. draw result) remaining the same until the end of the game. The method involves players placing requests. Upon reception of requests, the system provides the requesting player with a game card and the active draw result. The system evaluates if a comparison between the game card and draw result fulfills an end-of-game criterion. When such criterion is fulfilled, the game card is declared a winning card and the system prevents the distribution of new cards. Otherwise, the system continues providing cards until the criterion is fulfilled. Accordingly, a suitable system is also described for the play of said participation game.

42 Claims, 6 Drawing Sheets

PARTICIPATION-GAME SYSTEM INCLUDING AN END-OF-GAME EVALUATION MEANS

CROSS-REFERENCE TO RELATED APPLICATIONS

This application is a Continuation-In-Part Application, and therefore claims priority of U.S. application Ser. No. 10/364,673 filed on Feb. 12, 2003 now U.S. Pat. No. 7,270,603 and entitled REVERSE-ORDER GAME PLAY APPARATUS. The whole content of said application is incorporated by reference into the present application.

FIELD OF THE INVENTION

The invention relates to a gaming method and a gaming system for the play of a game with many players participating in the same game until the occurrence of a winner.

BACKGROUND OF THE INVENTION

Wagering games are very popular nowadays, and the game creators compete to find new game methods, systems and features to attract and to interest players while staying in the desired game category.

Two such categories are bingo and lotto. Bingo and lotto games are very popular. They offer to players a competition among themselves to determine a winner and depend on a random result (ball draw) for the determination of said winner. To play these games, players are required to purchase cards, to wait for the draw to occur, and to compare their cards with the draw for determination of a winning prize. This process requires time, whereas players demand games wherein determination of their wins should become available more and more rapidly, and ideally upon purchase of the card.

To resolve such problems, Lind et al. have filed a U.S. patent application entitled METHOD AND PROGRAM PRODUCT FOR PRODUCING AND USING GAME PLAY RECORDS IN A BINGO-TYPE GAME, U.S. patent application Ser. No. 10/028,889, filed on Dec. 20, 2001. In this patent application, Lind demonstrates how to generate bingo cards and a bingo draw in a back office; to evaluate them based on criteria; to store them on a server; and to provide them in random order to players on gaming terminals.

Accordingly, there is a need in this field for improvement, and the invention provides such improvement in a particular way.

OBJECTS OF THE INVENTION

Accordingly, an object of the invention is to provide a method and a system to play a game that depends on the comparison of players' personal objects (hereinafter called game cards) provided by the game with a common object (hereinafter called draw result) remaining in effect until the occurrence of a game win.

Another object is to provide a bingo and lotto gaming system wherein no control is applied to the game, and therefore wherein the legitimacy of the game is undisputable. Furthermore, there is a need for a game that will be played until a winner is determined. Moreover, this game should include a winning prize and a plurality of participation prizes, wherein the goal of the participation prizes is to maintain the players' interest.

Another object is to provide said player with a winning prize in response to said occurrence of a game win.

Another object is to provide a plurality of participation prizes that are available from the start of the game to said occurrence of a game win.

Another object is to provide a system and method guaranteeing an environment wherein competition among players is available to determine which one of said players will be the winner.

Another object is to offer a system wherein some information are not generated, evaluated, or provided before the start of the game.

Another object is to provide a game wherein players must complete an action for activating their participation in the game. Accordingly, a player only buying a personal object for playing the game but not completing an evaluation of said personal object would "sleep on" the game and therefore automatically forfeit his potential wins.

Another object is to provide a system offering alternatives in its embodiments. Accordingly, an embodiment may strongly differ from another while following the same method herein described.

Finally, the ultimate object of the invention is to fulfill any objects not includes in the above-listed objects but that anyone can understand while reading the appending claims.

SUMMARY OF THE INVENTION

Accordingly, the invention consists in a method of playing a participation game among a plurality of players. The method involves comparing players' objects (a.k.a. game cards) with a common object (a.k.a. draw result) remaining the same until the end of the game. In the context of the game, a common object can be seen as a playing card and can consist in any medium bearing gaming information that the goal is to be compared with comparison information to determine its value. Such game card may include paper-based cards and electronic data. In the same manner, a common object or draw result includes any information used for comparison to determine a game card value. Examples of such draw results are: bingo draws, lotto draws, electronically generated gaming information, etc.

The method hereinafter described consists in the player placing a request for a play of the game. Upon reception of this request, the system provides the player with a game card and the active draw result. The system compares the game card and the draw result to evaluate fulfillment of an end-of-game criterion. When such criterion is fulfilled, the game card is a winning card and the system prevents the distribution of new cards. Otherwise, the system is free to continue providing cards until the criterion is fulfilled.

A suitable system according to the present invention includes a memory space for storing the draw result, with the information stored in this memory remaining unchanged until the end of the game. It also includes a means to generate draw results. Another part of the system is the module handling players' requests and responding to said requests. An end-of-game evaluation means completes the system by evaluating each combination of game card and draw result when responding to players request and therefore changing the state of the game (usually ending the game) when needed.

The method and system of the invention includes other characteristics, not necessary required to fulfill the goal of the invention, that are included in the following description and the appended claims.

BRIEF DESCRIPTION OF THE DRAWINGS

These and other aspects and advantages of the present invention will become better understood in light of the following detailed description of preferred embodiments with reference to the accompanying drawings, in which.

DETAILED DESCRIPTION OF THE INVENTION

Figure 1:
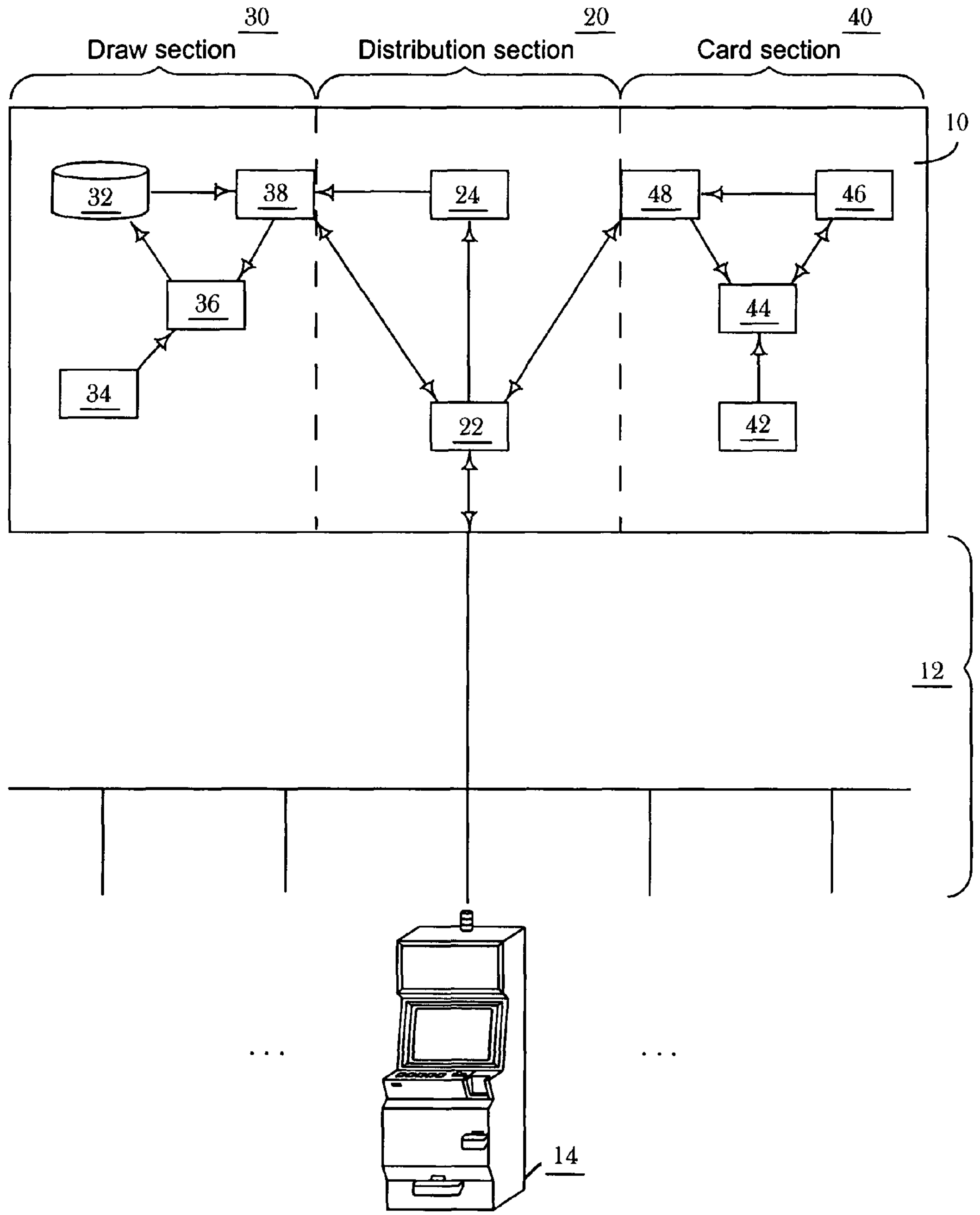
FIG. 1 is a schematic block diagram illustrating a game distribution system in accordance with a suitable embodiment of the invention.

System Description:

A preferred embodiment for the implementation of the invention, illustrated on FIG. 1, includes a central server, thereafter called game distribution system 10, a network and network-related components, thereafter called communication means 12, and a series of gaming apparatus 14.

Figure 2:
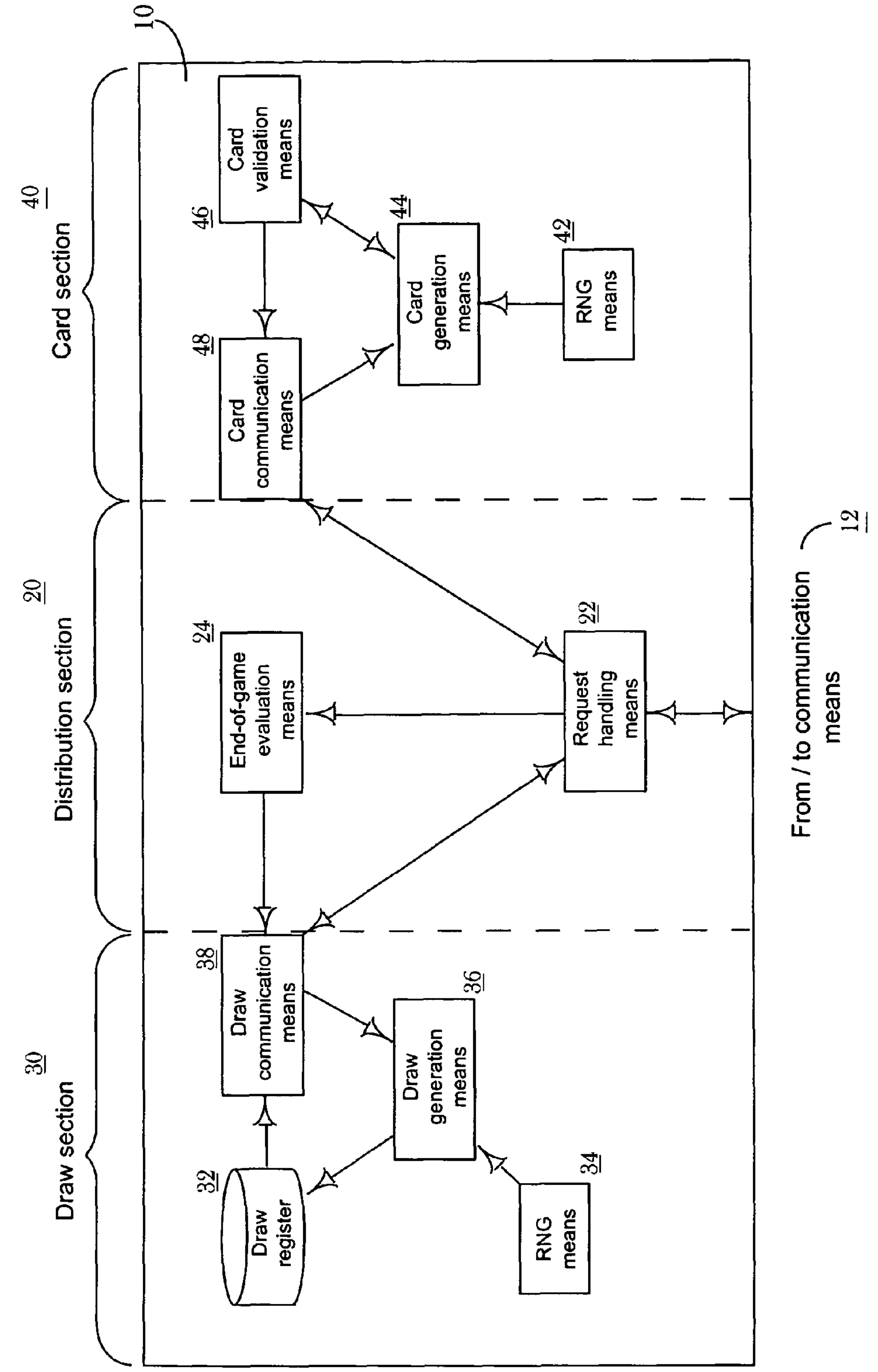
FIG. 2 is a schematic block diagram illustrating the game distribution system components.

The game distribution system 10, as shown in FIG. 2, is a central system used for the generation and distribution of gaming information that are provided to the players on their gaming apparatus. The game distribution system can be divided in three sections: a distribution section 20, a card section 40 and a draw section 30.

The draw section 30 includes a draw register 32, in which the draw used for the game evaluation is kept; random number generator means (hereafter called a RNG means 34) providing data for draw generation; draw generation means 36 that receives data from the RNG means 34 and generates a draw result that is stored in the draw register 32; and draw communication means 38 that handles draw-related tasks, such as initiation of a new draw or communication of a draw result.

The card section 40 includes RNG means 42; card generation means 44 that creates game cards based on data provided by the RNG means 42; card validation means 46 that evaluates whether a generated game card has already been generated in relation to the current draw and that commands the generation of a new card in the case of a positive evaluation; and card communication means 48 that handles other card-related tasks, such as card request and communication. Commonly, a draw result is composed of a set of numbers, with the game card bearing also numbers. In a bingo game, a typical game card bears 24 numbers, while the draw result comprises about 50 numbers.

The distribution section 20 is composed of request handling means 22 that receives game requests from gaming apparatus 14, that requests a draw result and a game card according to said request, and that provides card and draw information to the requesting gaming apparatus and to the end-of-game evaluation means 24. The distribution section 20 is also composed of said end-of-game evaluation means 24, which compares draw information with game card information to identify fulfillment of an end-of-game criterion. Upon positive evaluation of said criterion, said end-of-game means 24 signals the end of the game to the draw communication means 38, the draw communication means 38 prevents the current draw to be associated with any new game card. An archiving means (not shown) can record any information provided by the system to eventually produce audits of the system. This archiving means may, for instance, record time, destination, values, and any other valuable information related to the play of the game. Afterwards, depending on the needs, this information may be stored on a permanent medium, such a CD-Rom.

Figure 3:
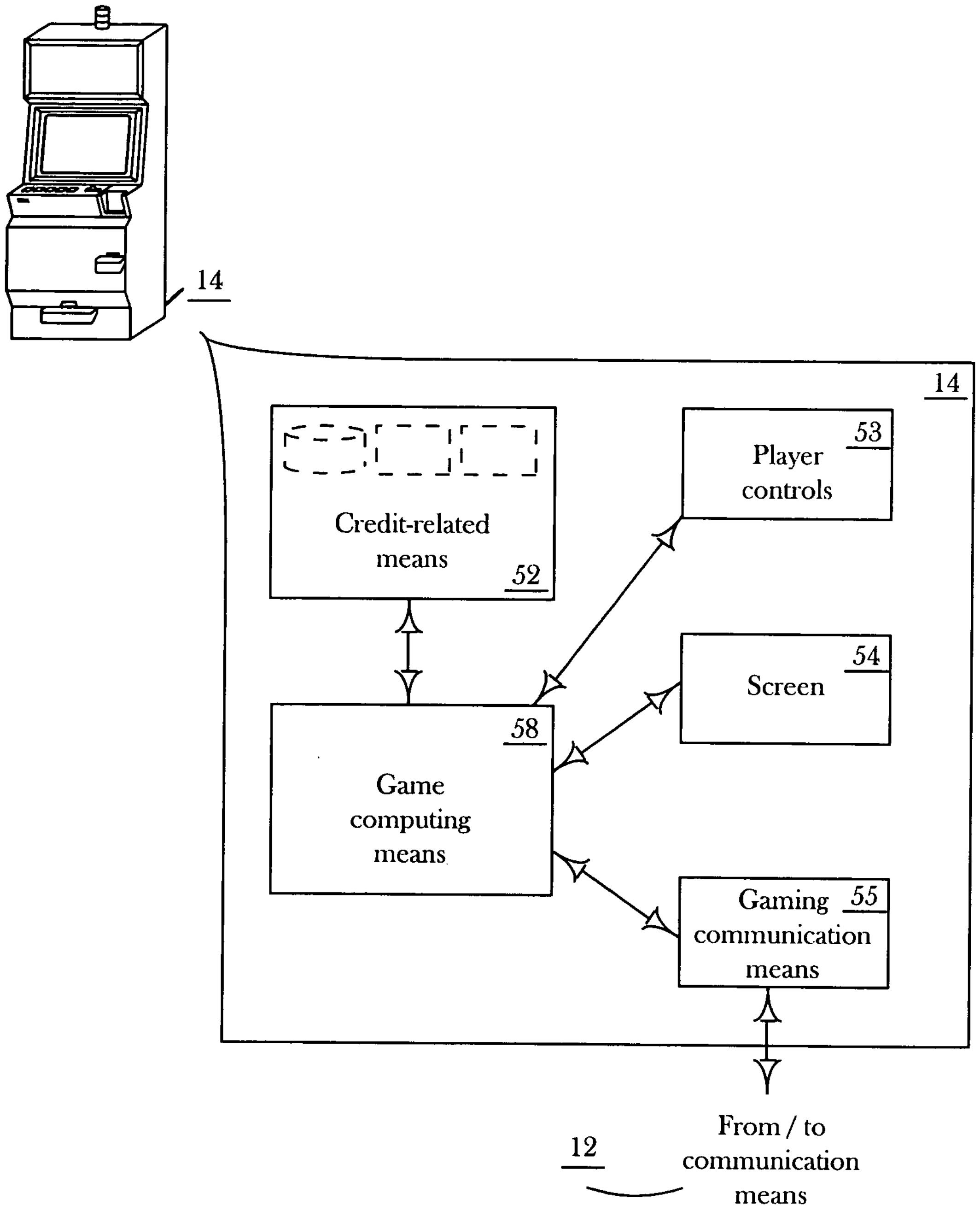
FIG. 3 is a schematic block diagram illustrating gaming apparatus components.

The gaming apparatus 14 illustrated on FIG. 3, on the other hand, is a remotely linked device on which the players play the game. Each gaming apparatus 14 is composed of credit-related means 52, for the insertion, handling, monitoring and redemption of players' credits; player's controls 53, which allow the player to input game-related information such as game level, game title selection, evaluation command, redemption request, etc; a screen 54 that provides a graphic interface for the player's selections and graphical representation of the game; gaming computing means 58 completing game-related tasks and controls, such as participation prize evaluation and game representation generation; and gaming communication means 55 communicating requests to the game distribution system 10 (FIG. 1), communicating other game-related information such as particular game states, and receiving information in response to said requests. Communications to and from the game distribution system 10 take place via communication means 12.

Figure 4:
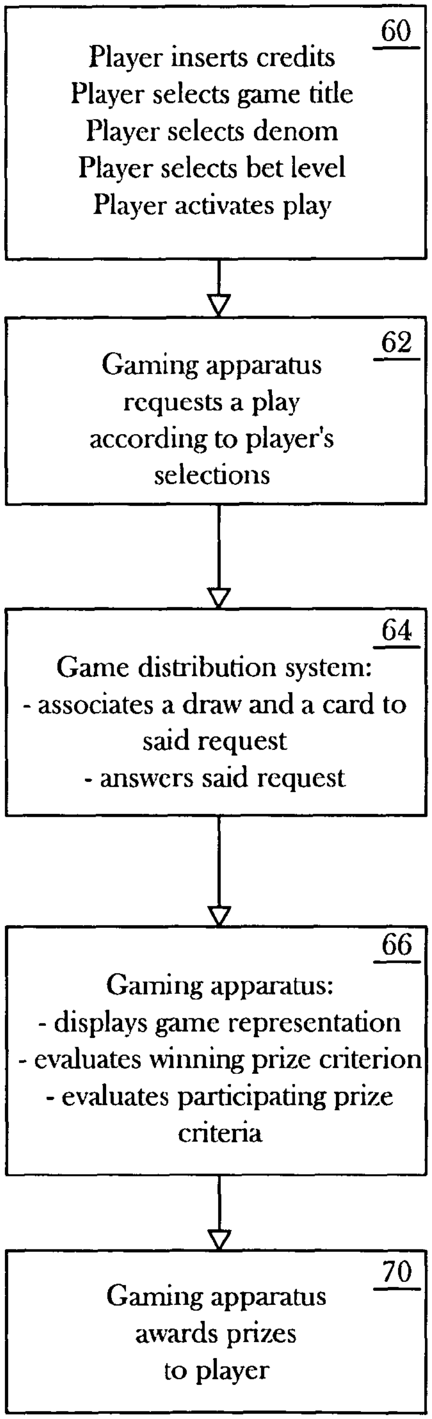
FIG. 4 is a flow chart illustrating steps of the method associated with the play of the game in accordance with an embodiment of the invention.

Method Description:

Now referring to FIG. 4, on the gaming apparatus, the player inserts credits; selects a game title, a game level, etc; and activates PLAY. Upon completion of this series of player inputs 60, the gaming apparatus sends to the game distribution system 10 a request for information for a corresponding play at step 62.

At step 64, the game distribution system 10, upon reception of said request, demands a corresponding draw result from the draw section 30, which is generated if no draw result is available, demands a corresponding game card from the card section 40, and transmits these information to the end-of-game evaluation means 24 and back to the requesting gaming apparatus 14.

Upon reception of game-distribution-means information, the gaming apparatus 14 displays a representation of the game on the gaming apparatus screen 54 compares game card information with the corresponding draw result information (step 66), and, at step 70, awards corresponding winning prize and/or participation prizes to the player when applicable.

Figure 5:
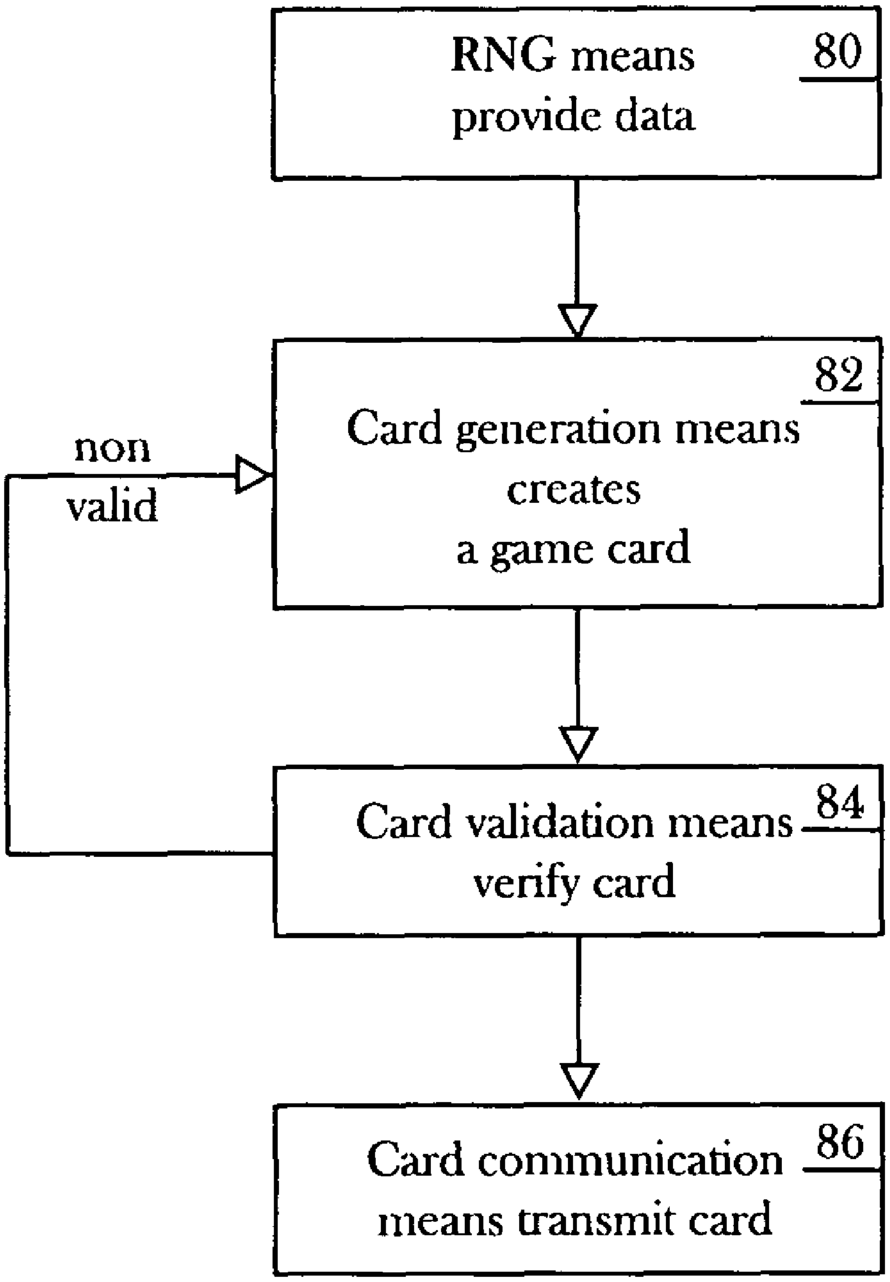
FIG. 5 is a flow chart illustrating card generation.

Now referring to FIG. 5, in response to request for a game card, the card generation means 44 receives, at step 80, data from the RNG means 42; uses these data to generate a game card (step 82), validates this game card for the current draw (step 84), and provides the requested game card (step 86). The step 82 of card validation guarantees that no duplicate game card is provided to players. If a game card bearing identical information has already been provided, a new game card has to be generated and validated.

Figure 6:
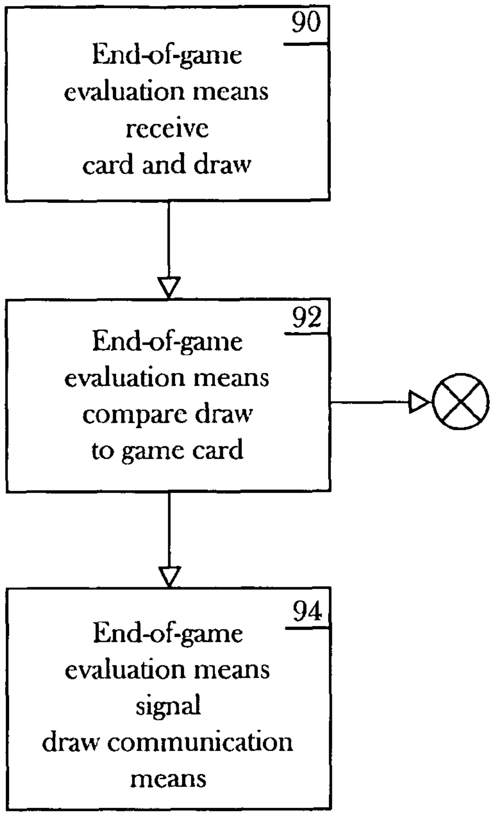
FIG. 6 is a flow chart illustrating end-of-game evaluation and result.

Now referring to FIG. 6, when the end-of-game evaluation means 24 receives a card and a draw (at step 90), it compares them in regard to an end-of-game criterion (at step 92). If the comparison corresponds to an end-of-game criterion, the end-of-game evaluation means 24 orders, at step 94, the draw section 30 to prevent any new use of said draw and to generate a new draw for the corresponding game title, thus initiating a new game of said game title.

Figure 7:
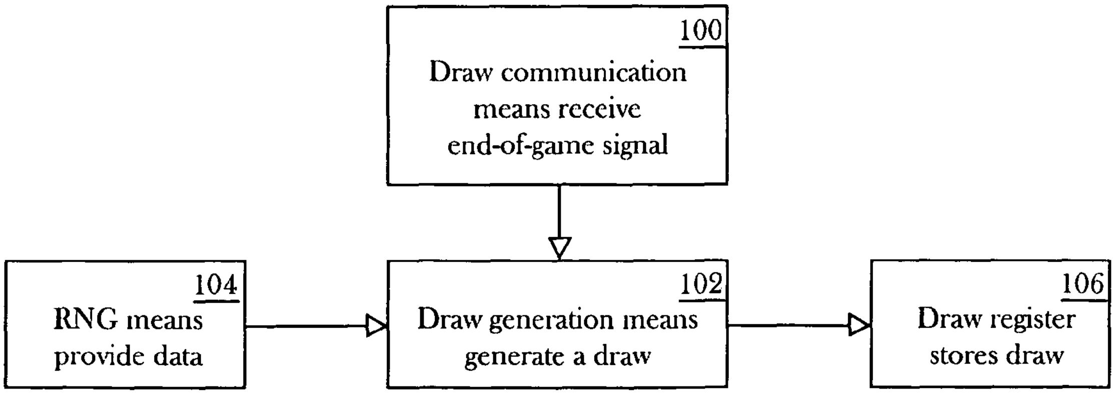
FIG. 7 is a flow chart illustrating draw generation.

Now referring to FIG. 7, upon receipt of a new draw signal from the end-of-game evaluation means (step 100), the draw generation means 36 generates a new draw (step 102), using data from the RNG means 34 (step 104), and stores said draw result in the draw register 32 (step 106). New draw requests associated with said game title are answered only after said new draw has been stored.

Available Alternatives:

An addition to the above-described method is to require an active participation of the players to the game. Accordingly, the addition to the method is to invite the players to complete a validation of their card upon receipt of the card and display of the draw result. If the player does not respond to the invitation within a predetermined delay, the player "sleeps on" his play, and therefore automatically forfeits his potential wins. If the player commands his card evaluation, through a general command such as touching the touch screen control or an evaluation button for instance, the gaming apparatus 14 evaluates, for the player, the card by comparing it with the draw, determines the prize, and awards this prize to the player.

If the evaluated game card fulfills the end-of-game criterion, the player is designated the winner. Accordingly, the gaming apparatus 14 sends a signal to the game distribution system 10, which ends the game by preventing a new association of a game card with the current draw. However, until the player receiving a card bearing the end-of-game criterion evaluates his card, therefore the player's gaming apparatus signaling the win, the system stays in an idle mode, preventing the distribution of new cards. If the player does not evaluate his card within the predetermined delay, the played is declared being "slept on" the game, and the system resumes distributing cards.

In consequence, a player must both receive a winning card and evaluate the winning card to be declared the winner, therefore automatically ending the game.

Another alternative is to use a draw means (not shown) separate from game distribution system 10 to generate said draw. For instance, the draw means may be an electromechanical bingo blower (not shown). Accordingly, the game distribution system 10 would not include said draw generation means 36 and RNG means 34. Said bingo blower would complete the same tasks and be in communication with said game distribution system 10, which would register the draw result and signal said bingo blower when a new draw result has to be generated.

Following the same principles and the same method, an alternative to the described game distribution system 10 is to include a card storage means (not shown) in which a series (or set) of cards to be played are stored in advance, ready for distribution. These cards may or may not be evaluated by the end-of-game evaluation means 24 prior to their distribution. If they are evaluated, each card triggering the end of the game is associated with a flag.

Additionally, the system may include a card monitoring means (not shown), particularly when game cards are stored in the system. The object of the card monitoring means is to validate the game so that it may end. Another goal is to increase the speed at which the end-of-game evaluation means determines if an association of a draw result with a game card fulfills the end-of-game criterion. The card validation means verifies, independently of the distribution of the game cards, which game cards fulfills the end-of-game criteria in association with a draw result. It stores this information, and transmits this information to the request handling means with the game card. Accordingly, when receiving draw results and game cards, the end-of-game evaluation means only needs to verify this particular information to establish a game win.

Furthermore, the card monitoring means keeps track of the distributed game cards that fulfill the end-of-game criterion. In case of a play having to be validated by a player to be effective, the card monitoring means informs the request handling means when the last game card fulfilling the criterion is distributed. Consequently, the whole system enters a special mode waiting indefinitely for this last game card to be validated by a player; i.e., to establish a winner.

An additional characteristic the system may take in a realization is to store a series of draw results, each one of these draw results being associated to a request on the basis of one or a set of particular characteristics of the request. For instance, a draw result may be associated with a game when played at a minimum bet level. However, for the same game, a second draw result may be associated with game cards when these cards are played at the maximum bet level. Accordingly, even if the two above examples uses the same game, they are processed by the system as independent game, therefore each of them using a different draw result stored in the system.

A characteristic of the game distribution system 10 is its ability to provide a series of prizes of variable values. These prizes are awarded upon evaluations that fulfill prize criteria. These prizes may range in value from low to high, and even include jackpots. The high prize value is not automatically associated with the end-of-game criterion. For instance, a jackpot prize may be associated with a criterion occurring on average every n winners, wherein n is more than 2.

Another characteristic that the game distribution system 10 may present is to provide an end-of-game criterion that may result in one prize that cannot differ. An example of this situation is a lotto game wherein a match of the first three digits is necessary to find a winner. If only the first three digits are evaluated, the value of the prize the player wins may vary according to whether more than three digits are matched. In consequence, an evaluation of all the lotto digits is completed with the criterion being a perfect match for the first three digits and a no-match for the remaining digits.

Accordingly, while the invention has been described in connection with the specific embodiment thereof and the disclosed alternatives, it will be understood that modifications are available. It is the intent to cover any variations, uses, or adaptations of the invention following, in general, the principles of the invention. Such covered applications will find their essential features herein set forth in the scope of the appended claims.

The invention claimed is:

1. A method of providing on gaming machines a participation game to players to determine a single game winning player, the method comprising the steps of:

at the beginning of the participation game, generating on a server or one of the gaming machines a current draw result comprising at least two numbers, said current draw result being the only draw result used throughout the participation game and the draw result remaining composed of a constant amount of said numbers throughout the participation game;

receiving from at least one of said players a play request to participate in said participation game;

associating a game card to said play request;

associating said current draw result to said play request;

establishing a play outcome for said play request, said play outcome being established by comparison of said current draw result and said game card; and providing on at least one of the gaming machines, to said at least one of said players with said participation in said participation game, said participation being composed of said game card, said current draw result and said play outcome;

determining whether a game ending state is achieved or not based on said comparison, and;

upon a positive determination, declaring said at least one of said players as the single game winning player and ending said participation game for all of said plurality of players by preventing association of said current draw result with a further play request; or upon a negative determination, maintaining said current draw result in its current form thereby having said current draw result remaining composed of a constant amount of said numbers, and associating said current draw result with a further play request, wherein all of said play outcomes are based on said current draw result, and wherein said participation game ends only upon such a positive determination.

2. The method of claim 1, wherein said end-of-game criterion comprises a unique criterion associated with a unique end-of-game prize.

3. The method of claim 1, further comprising identifying a winning game card upon a positive evaluation of said end-of-game criterion.

4. The method of claim 1, further comprising signaling the end of said game upon the game ending state being achieved.

5. The method of claim 1, further comprising initiating use of a new current draw result upon the game ending state being achieved.

6. The method of claim 1, further comprising initiating the use of a new current draw result upon reception of a first play request for participation into said participation game.

7. The method of claim 1, further comprising generating said game card in response to said play request.

8. The method of claim 1, further comprising randomly selecting said game card among a set comprising a plurality of game cards upon reception of said play request.

9. The method of claim 8, further comprising generating said game card set; and storing said game card sets in a card storage means.

10. The method of claim 9, wherein said step of associating a game card further comprises retrieving said game card from said card storage means.

11. The method of claim 9, wherein the step of generating a game card set further comprises flagging game cards of the game card set that fulfills said end-of-game criterion upon comparison of said game card to said current draw result, wherein the step of flagging game cards is performed before the step of storing said game card set.

12. The method of claim 1 further comprising comparing said game card with said current draw result against prize criteria; and awarding prizes to said player based on said comparison.

13. The method of claim 12, further comprising associating at least one of said prize criteria with said end-of-game criterion.

14. The method of claim 13, further comprising associating at least one of said prize criteria with a prize that is more valuable than said prize associated with said end-of-game criterion.

15. The method of claim 1, wherein all steps of said method are performed in a central game distribution system.

16. The method of claim 1, wherein at least one of the steps of said method is performed on a discrete gaming apparatus remotely in communication with a central game distribution system wherein at least one other step of the method is performed.

17. The method of claim 1, wherein a prize or a win is associated with a play request only after completion of a validation process.

18. The method of claim 1 further comprising requesting completion of a validation process by said player to establish a play outcome for said play request.

19. The method of claim 18 further comprising holding new play requests during said completion of said validation process.

20. The method of claim 18, wherein the step of determining whether a game ending state is achieved further comprises registering said completion of said validation process.

21. The method of claim 18, wherein said completion of said validation process is limited in time.

22. The method of claim 1, wherein the step of receiving from at least one of said players a play request is performed after the step of maintaining said current draw result in its current form when said game ending state is not achieved.

23. The method of claim 1, wherein the method is performed at least twice, each time the method being performed being over reception of at one said play request.

24. A system for handling game related information in relation with a participation game played among players and ending upon determination of a single winning player among said players, the system comprising:

a server divided in three sections:

a draw section comprised of a random number generator, draw generation means to generate a draw result based on the data provided by said random number generator, and a draw register to store said draw result, said draw result remaining unchanged over said participation game thereby remaining composed of a constant amount of numbers until determination of said winning player, and being the only draw result used throughout the participation game;

a card section comprised of card generation means to create game cards based on the data provided by said random number generator; and a distribution section comprised of;

request handling means to receive a play request from at least one of said players, which comprises associating said game card and said current draw result to said play request, establishing a play outcome for said play request, said play outcome being established by comparison of said draw result and said game card and transmitting said game card and said draw result to said at least one said of players said draw result being provided at the same time as said game card to said player; and end-of-game evaluation means to compare said game card to said draw result to verify fulfillment or not of an end-of-game criterion of said play request, and, upon a positive evaluation of fulfillment of said end-of-game criterion, declaring said at least one of said players to be the single game winning player of said participation game and ending said game for all of said players by preventing association of said current draw result with a further play request, or upon a negative evaluation of fulfillment of said end-of-game criterion, continuing said participation game by allowing at least one further play request to be associated with said current draw, whereby the system processes play requests independently from each other and wherein said participation game ends only upon such a positive determination.

25. The system of claim 24 further comprising at least one of draw communication means for handling communication of said current draw result; and card communication means for handling communication of said game card.

26. The system of claim 24 further comprising archiving means for archiving distributed play information.

27. The system of claim 24, wherein said card distribution means comprises card storage means for storing a card set comprising a plurality of cards ready to be associated with play requests.

28. The system of claim 25 further comprising card drawing means for randomly drawing a card from said card set to associate with said play request.

29. The system of claim 24, wherein said card distribution means comprises a card generation means.

30. The system of claim 24, further comprising card validation means for validating said game card to be distributed, therefore preventing card distributing means to provide duplicate game cards during said participation game.

31. The system of claims 24, wherein said system comprises a plurality of separate physical entities, and wherein said draw generating means and said request handling means each form part of a distinct one of said separate physical entities.

32. The system of claim 31, wherein said draw generation means comprises one of a bingo blower and a set of lotto blowers.

33. The system of claim 24, further comprising prize evaluation means for comparing said current draw result with said game card to identify a winning prize value; and prize awarding means delivering the identified prize value to said player.

34. The system of claim 33, wherein said prize evaluation means and prize awarding means are remotely connected to said request handling means.

35. The system of claim 33, further comprising jackpot means for monitoring and awarding a jackpot prize.

36. The system of claim 24 further comprising a plurality of draw registers with each one of them being associated with a different game title.

37. The system of claim 24, further comprising a criteria evaluation means comparing said game card with said current draw result, the criteria evaluation means being in remote communication with at least said end-of-game evaluation means.

38. The system of claim 37 further comprising validation means for completing a validation process.

39. The system of claim 38, wherein the system further comprising idle means for idling the handling means until completion of the validation process.

40. The system of claim 37 further comprising a card monitoring means for verifying when no possible card that is available to be distributed can fulfill the end-of-game criterion based on said comparison of said game card to said current draw result.

41. The system of claim 24, wherein said participation game starts upon reception of a first play request in relation with said participation game.

42. A method of providing on gaming machines a participation game to players ending upon determination of a single winning player among said players, the method comprising the steps of:

at the beginning of the participation game, generating on a server or on one of the gaming machines a current draw result comprising at least two numbers, said current draw result being the only draw result used throughout the participation game and the draw result remaining composed of a constant amount of said numbers throughout the participation game; and upon receiving a play request from at least one of said players to participate in said participation game:

beginning a game play for said at least one of said players;

associating said play request to said current draw;

generating a game card and associating said game card with said play request;

establishing a play outcome for said play request, said play outcome being established by comparison of said associated game card and said current draw;

evaluating said play outcome according to a pay table and awarding on one of the gaming machines an award corresponding to said evaluation;

determining whether a game ending state is achieved or not based on said comparison, and:

upon a positive determination, declaring said at least one of said players as the single game winning player and ending said participation game for all players by preventing association of said current draw with a further play request; while upon a negative determination, continuing said participation game by maintaining said current draw result in its current form thereby having said current draw result remaining composed of a constant amount of said numbers, and allowing at least one further play request to be associated with said current draw;

responding to said player request with said game card, said current draw result and said play outcome; and regardless of whether or not said game ending state is achieved, ending said game play for said at least one of said players, wherein all of said play outcomes are based on said current draw result; and wherein said participation game ends only upon such a positive determination.

* * * * *